(12) United States Patent
Gustafsson et al.

(10) Patent No.: US 6,561,036 B1
(45) Date of Patent: May 13, 2003

(54) PRESSURE SENSOR FOR MEASUREMENT OF GAS PRESSURE IN A CYLINDER OF A COMBUSTION ENGINE

(75) Inventors: Pär Gustafsson, Västerås (SE); Pavel Kolavcic, Västerås (SE); Ulf Lifvenborg, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/674,977
(22) PCT Filed: May 11, 1999
(86) PCT No.: PCT/SE99/00785
§ 371 (c)(1), (2), (4) Date: Dec. 27, 2000
(87) PCT Pub. No.: WO99/58945
PCT Pub. Date: Nov. 18, 1999

(30) Foreign Application Priority Data

May 14, 1998 (SE) .............................................. 9801681

(51) Int. Cl.[7] .................................................. G01L 7/00
(52) U.S. Cl. ........................ 73/714; 73/118.1; 73/118.2; 73/756
(58) Field of Search ............................... 73/714, 118.1, 73/118.2, 756, 219, 729.2, 730, 720, 726

(56) References Cited

U.S. PATENT DOCUMENTS

| 3,898,885 A | 8/1975 | Russell |
| 4,290,311 A | 9/1981 | Brewer |
| 4,408,496 A | 10/1983 | Dahle et al. |
| 5,044,203 A | 9/1991 | Wiest et al. |

FOREIGN PATENT DOCUMENTS

| DE | 2747949 A1 | 5/1978 |
| EP | 0017200 A1 | 10/1980 |
| EP | 0035249 A1 | 9/1981 |
| GB | 1389408 A | 4/1975 |
| GB | 2019007 A | 10/1979 |
| GB | 2198239 A | 6/1988 |

Primary Examiner—Hezron Williams
Assistant Examiner—Corey D. Mack
(74) Attorney, Agent, or Firm—Dykema Gossett, PLLC

(57) ABSTRACT

Pressure sensor for measurement of gas pressure in a cylinder of a combustion engine, including a tube shaped in cross section as an hourglass. In the axial direction the tube consists in part of a section connected to the cylinder and open to the cylinder, in part of a measuring section and in part of a final section the end of which is closed. The measuring section of the tube is shaped so that in the tubes axial direction two parallel measuring surfaces are established against which are two beams connected to force transferring yokes arranged to influence force measuring organs for the determination of the force with which the gas pressure influences the parallel measuring surfaces of the tube. In this pressure sensor and other embodiments the influences of temperature fluctuations and any shunting effects of the material of the measuring tube are reduced to a minimum.

8 Claims, 3 Drawing Sheets

PRESSURE SENSOR FOR MEASUREMENT OF GAS PRESSURE IN A CYLINDER OF A COMBUSTION ENGINE

TECHNICAL AREA

The present invention concerns a pressure sensor for the continuous measurement of gas pressure inside the cylinders of a combustion engine. The pressure sensor is consequently placed in a very severe environment with high pressure of several hundred bar and a temperature of up to 1000° C. Continuous measurement to be able to determine the pressure distribution during every working cycle in the combustion engine places heavy demands on the dynamic response of the pressure sensor to rapid processes.

The greatest area of use for continually measuring pressure sensors is in very large combustion engines which are operated at relatively low revolutions per minute. Such motors are used for example as ships engines and as stationary engines for driving electrical generators and gas compressors.

Because of the growing demands for reduced consumption of fuel and continually increasing environmental demands on the chemical composition of exhaust gases the requirement to monitor the operation of combustion engines has increased. Misfiring influences exhaust gas chemical composition and can also negatively influence the working life of a combustion engine. With the help of continuous measurement misfiring can be detected and action be taken to ensure proper functioning is regained.

The technical area in which such pressure sensors work places high demands on long term stability so that the high temperatures existing do not influence the ageing characteristics of the pressure sensor material.

THE STATE OF THE ART, THE PROBLEM

A pressure sensor for continuous measurement of gas pressure in the cylinders of combustion engines is described in U.S. Pat. No. 4,408,496. The embodiment is reproduced in FIG. 1 which shows that the sensor comprises a tube-shaped channel 1 with circular cross section one end of which is connected to and open to the cylinder (not shown) for which the gas pressure is to be determined. The channels other and closed end consists of a relatively flexible membrane-like circular disc shaped part 2 against which the gas pressure of the cylinder connected side is to exert an affect. The circular disc shaped part is concentric relative to the tube-shaped channel and equipped with a central projection or lug 3. The gas pressure is transferred via the channel 1 to the circular shaped disc part 2 and the central lug 3 via a force transferring means 4 to a force measuring means 5. The force transferring means is so shaped that the force from the gas pressure which influences the circular disc shaped part is converted via the force transferring means 4 to a tension in the force measuring organ 5. The tube-shaped channels other cylindrical surrounding parts are, because of the pressure sensors construction, regarded as very rigid. A complete system for gas pressure monitoring with a sensor according to the said U.S. Patent is described in an article "CYLDET, ASEA'S SYSTEM FOR MONITORING THE COMBUSTION PRESSURE IN DIESEL ENGINES" presented at the American Society of Mechanical Engineers Meet Apr. 5–10, 1975 (75-DGP-11).

In the periodical MARINE ENGINEERS REVIEW, October 1995 there is an advertisement with "Reader ref. A1037" which summarily presents a pressure sensor SEC ENGINE ANALYZER. In the reference it is clear that the gas pressure, via a circular cross-sectioned, relatively thin walled tube of which one end is open to a cylinder which is not shown, is able to influence the circular end surface of the channels closed other end. The tube is connected, via welds in the tube ends, to a membrane of magnetic material. The membrane is mechanically pre-tensioned and in contact with the tube via the welds. Between the membrane and the cylindrical tube there is a column for thermal insulation. Gas pressure is determined indirectly using changes in the length of the tube as the starting point. The connected membrane is made to vibrate with the help of magnetic coils and the reference claims that the square of the changes in frequency of the vibrations are proportional to the actual gas pressure.

The disadvantage with that construction is that the membrane and tube have dissimilar temperature coefficients which leads to large variations arising in the tension in the membrane which solely depend on the temperature and which become interpreted as a pressure change. Even more serious is the fact that the tube is subjected with every pressure pulse to a corresponding adiabatic thermal pulse from compressed gas. This pulse causes in turn a dynamic change in length of the tube which is also received as a pressure change by the measuring system. Taken together this means that the pressure sensor introduces a dynamic measuring error which varies with peak pressure and frequency.

In a brochure from KISTLER, "KISTLER INFORMATION 53, DECEMBER 1996" a pressure sensor is described as consisting of a thick walled tube with a cross section in the form of a circular ring. Axially a part of the tube with a cross section corresponding to a sector of a circle has been removed. The effect of cylinder pressure in the tubes inner cavity causes the tube to expand in a tangential direction proportional to the cylinder pressure. The expansion is determined with a piezoelectric element. The disadvantage with a pressure sensor based on piezo crystals is that they measure only dynamic pressure and consequently cannot be used to measure static pressure. Even here there is a dynamic displacement pulse which depends the corresponding thermal-adiabatic thermal pulse in the gas. Measuring errors such as these have great significance in the evaluation of the efficiency of a cylinder in a motor.

Thus a circular cylindrical tube with an opening to a cylinder and a closed other end is subjected to cylinder pressure and that cylinder pressure will influence both the axial length and the diameter of the tube. In the above mentioned US-patent the force with which the cylinder pressure influences the closed end is used and in the above mentioned SEC ENGINE ANALYZER the changes in axial length caused by cylinder pressure are used for the determination of cylinder pressure. The changes in diameter in the circular cylinder tube can still not be used for the determination of cylinder pressure on the grounds that there is a column between the measuring membrane and the pressure cylinder and that a extension cannot be transferred via the column.

In GB 1389408 a device for the measurement of the pressure of a fluid in a circular tube is shown, with an embodiment adapted to measure the gas pressure from a cylinder. The measuring section of the tube is circular in cross section.

From GB 2019007 a similar device is shown for measuring gas pressure in a cylinder. It is known from this device to use a tube in which the walls on the outside surface of the tube in the measuring section form two plane parallel surfaces. From U.S. Pat. No. 4,290,311 it known to measure the pressure in a tube where two transducers are held against the tube. The tube is circular in cross section at the point of measurement. The transducers in the form of strain gauges are held between two parallel parts and the contact faces of the transducers have been shaped to conform to the circular tube. From U.S. Pat. No. 3,898,885 it is known to use a tube with circular cross section to measure the fluid pressure in a flexible hose. From GB 2198239 it is known to use a tube with plane parallel measuring surfaces to measure the fluid pressure in a flexible hose. From U.S. Pat. No. 5,044,203 it is also known to use a tube with plane parallel measuring surfaces to measure the fluid pressure in a flexible hose.

DESCRIPTION OF THE INVENTION, ADVANTAGES

A pressure sensor according to the invention also comprises a tube one end of which is open to a cylinder for which the gas pressure will be measured. The other end of the tube is closed in the same way according to the state of the art. The invention consists in that the tube is shaped in such a way that movements in the walls of the tube can be used for the determination of cylinder pressure instead of using the pressure against the closed end of the tube.

An embodiment of a tube with those characteristics is reproduced in FIG. 2, which is to say a tube shape with a measuring section which is essentially different to the circular tubes and tubes with plane parallel surfaces according to the state of the art. The tube consists in the axial direction of a part connected to the cylinder, a measuring section and a closed part.

In an embodiment of the measuring tube of the pressure sensor, as shown in FIG. 2, the walls of the tube 6 are so shaped that the internal cross section is like that of an hourglass. The hourglass cross section consists of two more-or-less circular parts connected by a waist with a height "h" in the y-direction. From a measuring point of view this gives two equivalent parallel measuring cross sections at a distance "h" apart from each other, each with a width "B", the distance between the centres of the two circular parts in the x-direction, and an axial length "L" in the z-direction.

Externally the tube touches solid beams 9, 10 on either side of the measuring surfaces 7, 8 which transfer pressure in the cavity to a force measuring means as shown, for example, in FIG. 5. This embodiment may also be shaped such that the beams 9, 10 are fixed to or made from the same material as the measuring tube 6, as shown in the exploded isometric view of FIG. 3.

In the hourglass embodiment the effects of temperature changes within the cavity have been minimised. Temperature changes, due to short pulses during compression and fuel burning in the cylinder, form a source of error. If the pressure sensor which measures the force due to gas pressure also measures the force due to temperature changes, then the measurement will contain an error. For this reason the walls of the pressure sensor tube 6 have been so formed as to minimise the effects of temperature change. This has been achieved by reducing two of the factors that determine the magnitude of the force due to temperature changes.

The effect of changes in temperature on the cavity walls of the pressure sensor gives rise to a force $F_S$ which is comparable to the compressive stress due to temperature change in a restrained spring which is equal to $$F_S = \Delta T . \alpha . h . k_x$$

where $F_S$=force due to a temperature change
$\Delta T$=change in temperature
$\alpha$=coefficient of expansion of the material
h=distance between the measuring surfaces
$k_x$=spring constant for the system The dimension h in the embodiment shown in FIGS. 2, and 3, the distance between measuring surfaces, is equivalent to the distance between the ends of a spring. The distance h, relative to the diameter H of the semi-circular sections of the tube, has been reduced by means of the waist in the hourglass shape and the stiffness $k_x$ of the measuring areas has been decreased by the great change in shape of the cross section of the pressure tube. The spring constant for this system is about an order of magnitude less than it would be for a device from the prior art measuring with two plane parallel surfaces. The large reduction in these two factors greatly reduces the effect of any forces FS on the measuring surfaces due to changes in temperature.

The embodiment shown in FIGS. 2, 3, 4, and 5 can be compared with the plane parallel devices of the prior art for example. If h=H/2 and the spring constant $k_x$ is reduced by an order of magnitude, the force $F_S$ due to a temperature change in the hourglass embodiment would be reduced to a fraction of the value compared to the effect on the devices with plane parallel measuring surfaces.

The beams 9, 10 seen in cross section in FIG. 2 are divided up in the axial direction, as shown in FIG. 3, into three sections 11, 12, 13 between the two end sections 18, 19 by means of the four slots 14, 15, 16, 17. The four slots are on either side of the measuring surfaces 7, 8 shown in FIG. 2. The slots have the effect of isolating the centre measuring section 12 from changes in the mechanical condition at the two ends 18, 19 of the tube. The centre measuring section in this embodiment approximates to a section in the middle of an infinitely long tube. The benefit of approximating an infinitely long tube is that pressure and temperature effects on the end parts becomes insignificant for the middle measuring section of the pressure sensor.

The centre measuring section 12 is surrounded by, or attached to, a force measuring means as shown in FIG. 5. In FIG. 5 the tube 6 is shown with a force measuring means incorporating two magnetoelastic transducers. In the embodiment shown in FIGS. 2, 3, 4 and 5 a dummy force measuring means may be mounted on beams of the sections 11, 13 on either side of the centre measuring section 12. The dummy force measuring means acts on the two sections on either side of the centre measuring section providing a similar mechanical system to the force measuring means that is mounted on the measuring section 12. This diminishes any difference between the mechanical behaviour of the centre section and the two sections beside it, so in this way, more closely approaching the ideal effect of an infinitely long measuring tube.

The result of these changes incorporated in the embodiment of the pressure sensor shown in FIGS. 2, 3, 4 and 5 compared to devices that use circular or plane parallel measuring surfaces is to reduce the influence of temperature pulses to a minimum.

In a further embodiment of the invention the walls of the tube may be constructed from more than one layer. The layers may be arranged, for example as concentric layers, as spiral layers, as layers attached to each other and as a mixture of concentric and spiral forms. The multiple wall embodiment confers the advantage that the relative stiffness for the same total wall thickness is greatly reduced compared to a single-walled tube. The relative stiffness is reduced due to the fact that the stiffness changes according to the cube of the thickness of the tube wall. This means that the same movement of the measuring surfaces therefore takes place at a relatively much lower gas pressure for the same total wall thickness in a multiple wall embodiment, thus reducing considerably the percentage of the shunting force of the tube in relation to the total pressure force measured.

The multiple wall embodiment further increases the accuracy of the measurement because the reduced pressure tube stiffness means that the shunting effect of the pressure sensor tube material is greatly reduced.

In another embodiment of the pressure sensor, the distance h between the measuring surfaces approaches a value of H, the inside diameter of the circular parts of the measuring tube. In this embodiment the walls of the measuring tube are constructed from more than one layer. This embodiment may be used in circumstances where measuring errors due to fluctuating temperature are sufficiently reduced. This may be achieved with a multiple wall embodiment where the reduced force necessary to produce measurable deflection of the measuring section of the tube under operating conditions makes the error due temperature fluctuations insignificant.

The pressure sensor according to the invention as described above has several advantages over pressure sensors for measuring gas pressure in the cylinders of a combustion engine according to the state of the art.

By using two identical measuring organs in a force measuring means better opportunities are obtained to compensate for systematic errors than for a pressure sensor based on one measuring area.

By using suitable measuring organs, as an example those which are based on the magnetoelastic principle, wire strain gauges and similar, a total deformation of sensor parts of only some $\mu$m are required. This means in turn that "shunting" of the force by the tube becomes small in relation to the gas pressures working force. The design of the tube and construction with the yokes described means moreover that the thermodynamic effects in the channel walls are only able to affect the measuring signal minimally. The relative sizes of the parallel measuring surfaces "B×L" respective to the other surface shapes are suited to the selected force transfer and measuring organs that are present. The minimisation of shunting effects becomes even greater when embodiments such as the hourglass shape and the multiple wall construction are combined in a pressure sensor.

A further advantage of the embodiment shown in FIGS. 2, 3, 4 and 5 is conferred by the smooth and uniform internal cross section of the tube-shaped part 6. This discourages the build of any waste or particulate matter from the cylinder gases and allows easy and thorough cleaning. The pressure sensor may be cleaned during a maintenance procedure by, for example, the application of compressed air, or by allowing the combustion gases to pass through the uniform tube with high speed during normal operation of the engine by opening a valve (not shown) situated at the end of the pressure sensor not connected to a cylinder.

SHORT DESCRIPTION OF THE FIGURES

DESCRIPTION OF EMBODIMENTS

Figure 1:
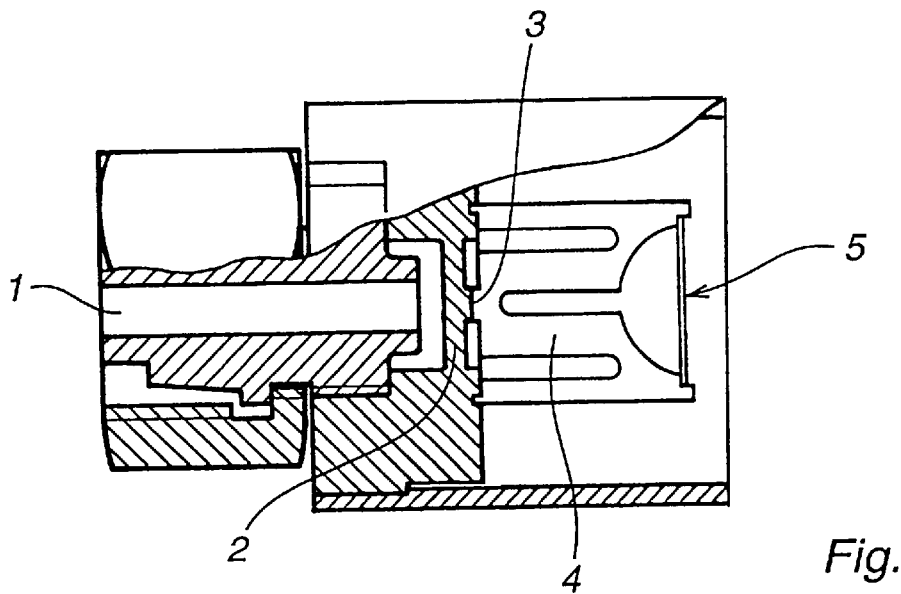
FIG. 1 shows an embodiment of a pressure sensor for gas pressure in a cylinder of a combustion engine according to the state of the art.
Figure 2:
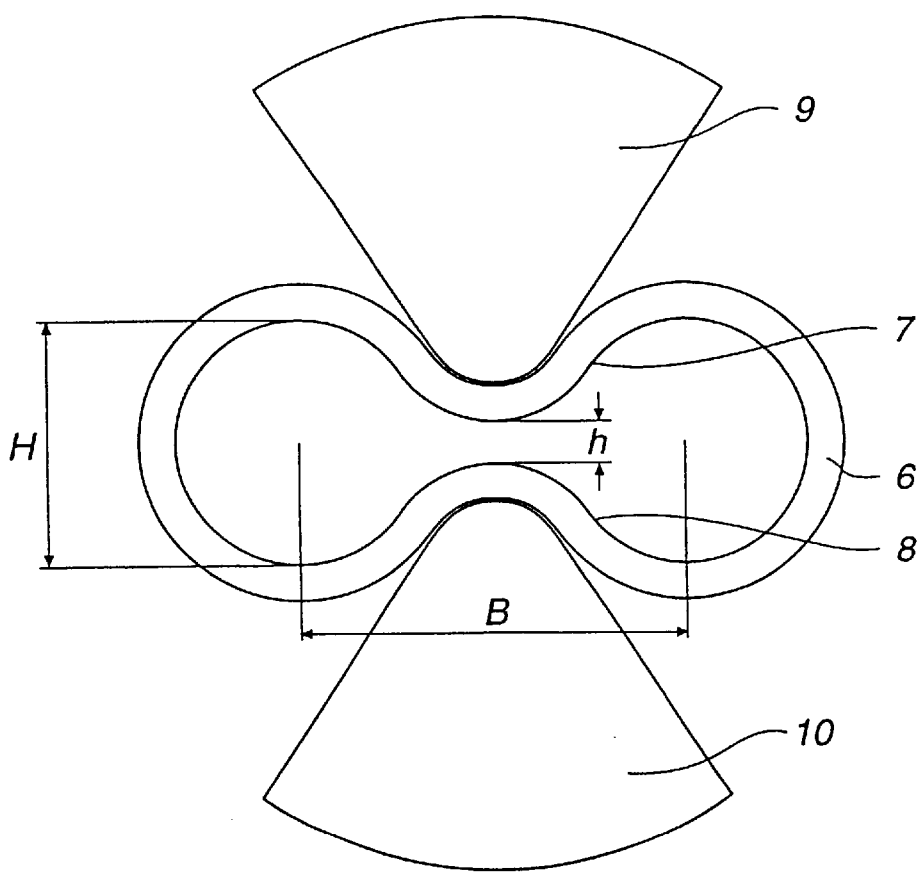
FIG. 2 shows a cross section of a tube which is included in a pressure sensor for gas pressure according to, the invention.
Figure 3:
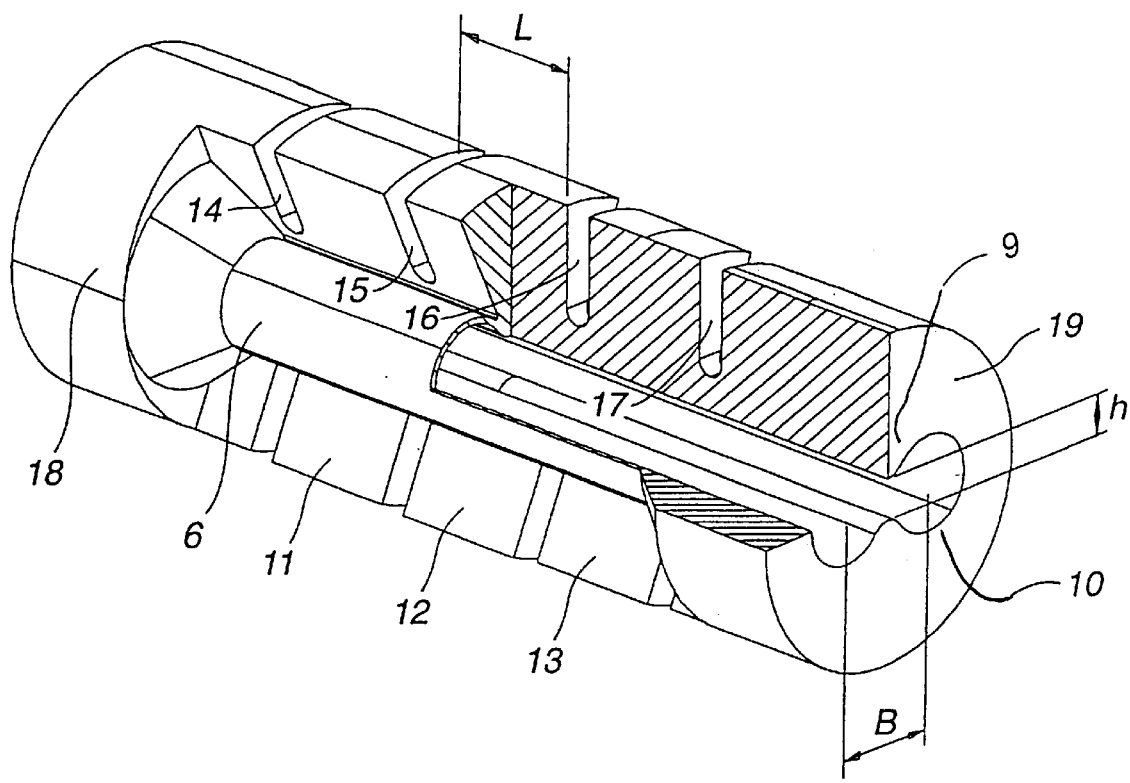
FIG. 3 shows an isometric view of an embodiment according to the invention.

An embodiment of a pressure sensor for gas pressure in a cylinder of a combustion engine is shown in FIG. 2 The walls of the measuring section of the tube 6 are so shape that the internal cross section is like that of an hourglass, consisting of two circles connected to each other by means of a waist section. In an alternative embodiment the walls of the tube can also be attached to be beams 9, 10, as shown in FIG. 3. The outer surface of the beam of section 12 is attached to a rigid force measuring means, as shown for example FIG. 5.

In the embodiment shown in FIG. 2, 3, 4 and 5 the dimension h, the distance between measuring surface, is reduce by means of the waist in the hourglass shape. In the axial direction the pressure sensor tube 6 has been divided up into three sections 11, 12, 13 between the two end sections 18, 19 by means of four slots 14, 15, 16, 17 in the beams 9, 10 shown in FIG. 3 which are on either side of the measuring surfaces 7, 8 shown in FIG. 2. The measuring surface in a tube with a cross section like the one shown in FIG. 2 have an equivalent width equal to the distance 'B' between the centres of the two circles and a length L in the axial (z) direction.

Figure 5:
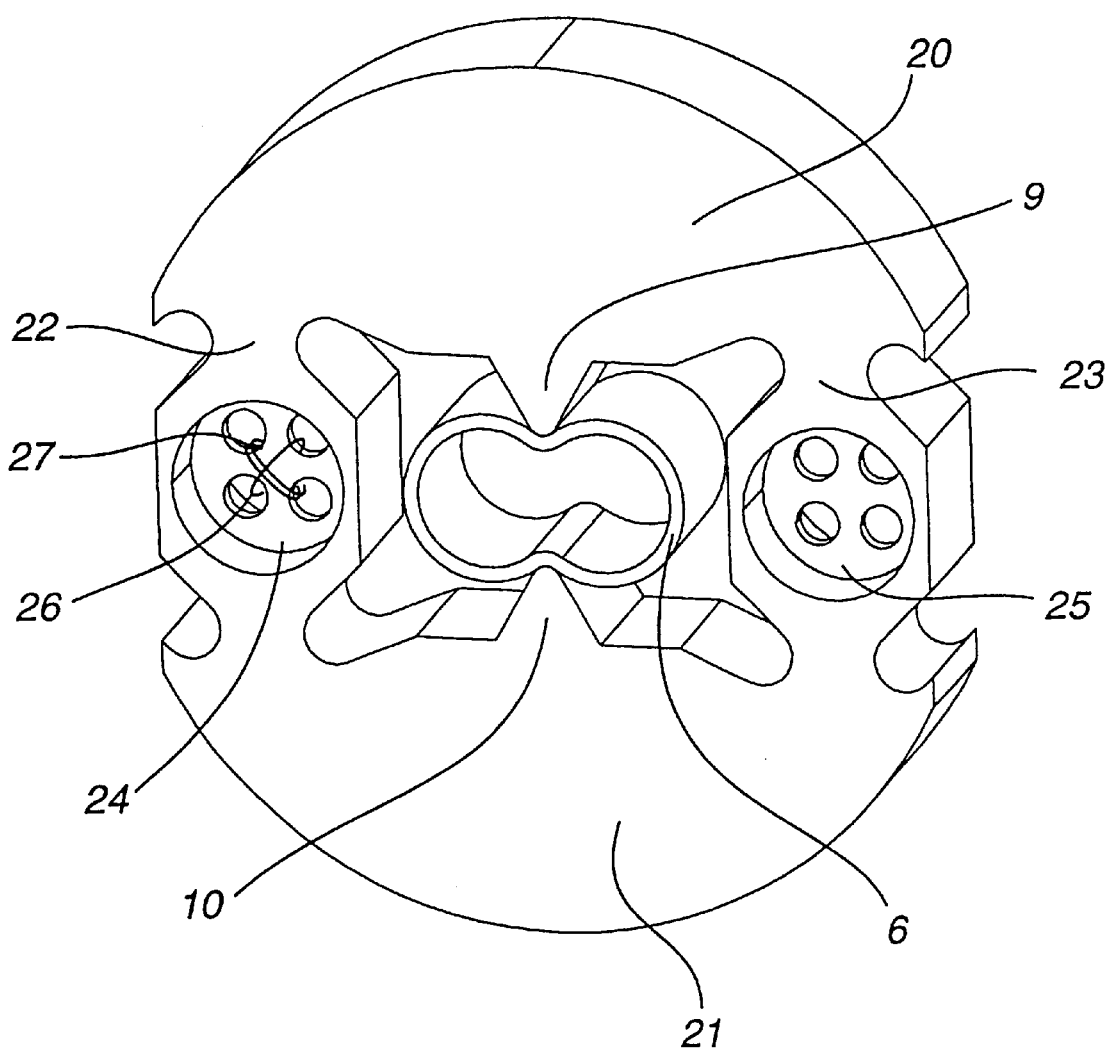
FIG. 5 shows another isometric view of an embodiment according to the invention with force measuring means.

The centre measuring section 12 is surrounded by a force measuring means touching the beams 9, 10 much the same as shown in FIG. 5. The tube described in the description of the invention is shown as 6. The tube shall run in to the cylinder for which the gas pressure will be determined. The other end of the tube, which is not shown, is closed. Against the previously described parallel measuring surfaces "B×L" in the tube are beams 9, 10 against which are fixed the force transferring yokes 20 and 21. The yokes 20 and 21 are integrated with the beams 9 and 10 in the embodiment shown in FIG. 5. For the attachment of the pressure sensor in the cylinder block the sensor is shaped suitably as a circular disk according to FIG. 5. That is also as a result of that the yokes outwardly turned parts take the form of an arc of a circle.

The tension measuring devices 22 and 23 which connect together both of the yokes 20 and 21 comprise the measuring organs 24 and 25 to form a force measuring means. In that embodiment shown the measuring organs are based on the well known magnetoelastic measuring principle according to the PRESSDUKTOR construction principle. That means that the recesses in both the tension measuring devices have been machined so that a circular membrane has been created in the limbs in a plane parallel with the plane of the cross section of the tube. Holes have been introduced in each membrane for a primary winding 26 for magnetisation of the membrane with alternating current and a winding 27 for measurement of voltages that arise.

In an alternative embodiment of the pressure sensor that may be formed in the same way as that shown in FIG. 5 the difference is that the machining has been carried out so that the circular membranes lie in a plane parallel with a plane perpendicular to a plane of the cross section of the tube which divides the tube into two identical halves.

In the embodiment shown in FIGS. 2, 3, 4, and 5 a dummy force measuring means may be mounted on beams of the sections 11, 13 on either side adjacent to the centre measuring section 12.

From the point of view of a pressure sensor it is obvious that it is the measuring section of the tube 12, FIG. 3, which is the most important part. The shape of the section connected to the cylinder and the open and respectively closed ends can be achieved with many different more or less tubular shapes. The starting material to make the tube can consequently be tube shaped or have another arbitrary shape depending on the final design and the opportunities for machining or shaping that are available.

In a further embodiment of the invention the walls of the tube may be constructed from more than one layer. The layers may be arranged in many different ways, for example as concentric layers, as spiral layers, as layers attached to each other and as a mixture of concentric and spiral forms.

In another embodiment of the invention, the distance h between the measuring surfaces approaches that of H, the inside diameter of the circular parts of the measuring tube. In this embodiment the walls of the measuring tube are constructed from more than one layer. This embodiment may be used in circumstances where measuring errors due to fluctuating temperature are sufficiently reduced. This may be achieved with a multiple wall embodiment where the reduced force necessary to produce measurable deflection of the measuring section of the tube under operating conditions makes the error due temperature fluctuations insignificant.

Figure 4:
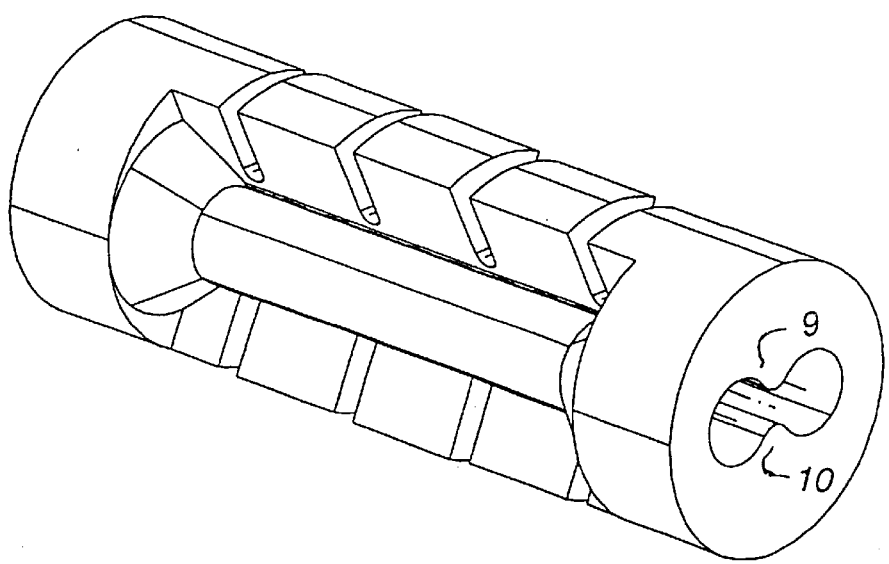
FIG. 4 shows an isometric view of an embodiment according to the invention.

The preferred and best embodiment of the invention is an embodiment shown in cross section in FIG. 2 and in isometric views in figs. 3, 4, in which the walls of the measuring tube 6 comprise more than one layer, and where dummy force measuring means are mounted on the beams 11, 13 on either side of the centre measuring section 12.

What is claimed is:

1. Pressure sensor for measurement of gas pressure in a cylinder of a combustion engine, where the pressure sensor comprises a tube which in the axial direction comprises a section connectable to the cylinder and open thereto, a measuring section with an axial length "L" and a final section the end of which is closed, wherein said measuring section has a cross section which comprises an hourglass shape formed of two circular shaped parts being separated by a distance "B" between their centers, and being connected to each other by a waist with a height of "h" which forms two parallel equivalent measuring surfaces "B×L" at a distance "h" from each other.

2. Pressure sensor according to claim 1, wherein the walls of said measuring section of the tube comprise one or more layers of wall material.

3. Pressure sensor for measurement of gas pressure in a cylinder of a combustion engine according to claim 1, wherein said measuring section of the tube is in contact with beams included in said pressure sensor which have yokes fixed to them, between which are connected tension force measuring devices comprising force measuring organs.

4. Pressure sensor for measurement of gas pressure in a cylinder of a combustion engine according to claim 3, wherein the force measuring organs are made up of magnetoelastic sensors.

5. Pressure sensor for measurement of gas pressure in a cylinder of a combustion engine according to claim 3, wherein the force measuring organs are made up of strain gauges.

6. Pressure sensor according to claim 1, wherein said measuring section of the tube is in contact with beams included in said pressure sensor which are divided by slots between two end sections such that there is at least one section on either side of said measuring section of the tube.

7. Pressure sensor according to claim 1, wherein an element comprising a dummy force measuring means, comprising a similar mechanical form to a force measuring means is mounted on the beams of one or more of the sections adjacent to said measuring section.

8. Pressure sensor according to claim 1 wherein the distance h between said measuring surfaces of the pressure sensor approaches the diameter H of the semi-circular parts of the tube.

* * * * *